(12) United States Patent
Araie

(10) Patent No.: US 10,758,980 B2
(45) Date of Patent: Sep. 1, 2020

(54) LAMINATE MOLDING APPARATUS

(71) Applicant: Sodick Co., Ltd., Kanagawa (JP)

(72) Inventor: Ichiro Araie, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 339 days.

(21) Appl. No.: 15/885,826

(22) Filed: Feb. 1, 2018

(65) Prior Publication Data

US 2018/0264550 A1    Sep. 20, 2018

(30) Foreign Application Priority Data

Mar. 14, 2017    (JP) ................. 2017-048388

(51) Int. Cl.
| | | |
|---|---|---|
| *B22F 3/105* | (2006.01) | |
| *B22F 3/24* | (2006.01) | |
| *B33Y 10/00* | (2015.01) | |
| *C21D 1/18* | (2006.01) | |
| *B33Y 50/02* | (2015.01) | |

(Continued)

(52) U.S. Cl.
CPC .............. *B22F 3/1055* (2013.01); *B22F 3/24* (2013.01); *B33Y 40/00* (2014.12); *B22F 2003/1057* (2013.01); *B22F 2003/248* (2013.01); *B22F 2203/03* (2013.01); *B22F 2998/10* (2013.01); *B33Y 10/00* (2014.12); *B33Y 30/00* (2014.12); *B33Y 50/02* (2014.12); *C21D 1/18* (2013.01);
(Continued)

(58) Field of Classification Search
None
See application file for complete search history.

(56) References Cited

U.S. PATENT DOCUMENTS

| | | |
|---|---|---|
| 4,863,538 A | 9/1989 | Deckard |
| 8,209,044 B2 | 6/2012 | Inoue |
| 2017/0274599 A1 | 9/2017 | Kitamura et al. |

FOREIGN PATENT DOCUMENTS

| | | |
|---|---|---|
| JP | H01-502890 | 10/1989 |
| JP | 2007016312 | 1/2007 |

(Continued)

OTHER PUBLICATIONS

Jelis (Jelis, E., Clemente, M., Kerwien, S., Ravindra, N. M., & Hespos, M. R. (2015). Metallurgical and mechanical evaluation of 4340 steel produced by direct metal laser sintering. Jom, 67(3), 582-589.) (Year: 2015).*

(Continued)

*Primary Examiner* — Bijan Mapar
(74) *Attorney, Agent, or Firm* — JCIPRNET

(57) ABSTRACT

A laminate molding apparatus calculates three-dimensional finished shape data after displacements occurred after molding of the initial molded object are completed based on a molding program corresponding to three-dimensional shape data of a molded object to be created, compares the three-dimensional finished shape data of the initial molded object with three-dimensional shape data to calculate a correction data of the displacement, creates a corrected molding program corresponding to corrected three-dimensional shape data in which coordinates of the surface of the molded object to be created by adding the correction data to the three-dimensional shape data, and molds a corrected molded object under the same molding conditions as when the initial molded object is molded based on the corrected molding program.

2 Claims, 9 Drawing Sheets

(51) Int. Cl.
    *B33Y 40/00*      (2020.01)
    *B33Y 30/00*       (2015.01)
(52) U.S. Cl.
    CPC ....... *C21D 2211/008* (2013.01); *Y02P 10/295* (2015.11)

(56) References Cited

FOREIGN PATENT DOCUMENTS

| | | |
|---|---|---|
| JP | 2010215971 | 9/2010 |
| JP | 2016-155257 | 9/2016 |
| WO | 2016042810 | 3/2016 |

OTHER PUBLICATIONS

English translation of "Office Action of Japan Counterpart Application," dated Apr. 19, 2018, p. 1-p. 3.
English translation of "Office Action of Japan Counterpart Application," dated Aug. 6, 2018, p. 1-p. 2.

\* cited by examiner

LAMINATE MOLDING APPARATUS

CROSS-REFERENCE TO RELATED APPLICATION

This application claims the priority benefit of Japan patent application serial no. 2017-048388, filed on Mar. 14, 2017. The entirety of the above-mentioned patent application is hereby incorporated by reference herein and made a part of this specification.

BACKGROUND

Technical Field

The disclosure relates to a laminate molding apparatus configured to mold a metal laminate molded object.

Description of Related Art

As a device configured to mold a metal laminate molded object, there is a laminate molding apparatus described in Japanese Translation No. H1-502890 of the PCT International Publication. In this laminate molding apparatus, directly above a molding table in a molding tank, a recoater head is moved in a single-axis horizontal direction, with a material storage box and a blade provided in the recoater head, a metal material powder is supplied and flattened to form a powder layer, and a laser emitting unit emits a laser beam to an emission area of the powder layer and a sintered layer is formed. Then, a new powder layer is formed on the sintered layer, a laser beam is emitted, and a sintered layer is formed, and these processes are repeated to mold a metal laminate molded object.

In addition, in a laminate molding apparatus described in Japanese Unexamined Patent Application Publication No. 2016-155257, a material powder whose surface is covered with a water-soluble organic material is supplied from a recoater head and flattened to form a powder layer, and water containing a crosslinking agent is discharged to a material powder constituting the powder layer. Therefore, the water-soluble organic material on the surface of the material powder is dissolved and crosslinks the material powder and a predetermined area of the powder layer is bonded and cured to form a molding layer. Then, the above process is repeatedly performed, a plurality of molding layers are laminated to mold a desired laminate molded object. Furthermore, when the laminate molded object is sintered using a sintering furnace, a final molded object as a metal sintered body is obtained.

Here, the molded object obtained by laminate molding contracts when the material powder is sintered during molding. Thus, in the related art, when generating the molding program of the molded object to be created, a method of correcting a molding program in advance so that a molded object to be molded based on the molding program has a creation target shape after the contraction is known.

In the laminate molding apparatus described in said Japanese Unexamined Patent Application Publication No. 2016-155257, the molding program of the molded object to be created is uniformly corrected with different correction amounts in a movement direction of the recoater head, a direction orthogonal to the movement direction of the recoater head in a horizontal direction, and a lamination direction of the molding layers based on data before sintering the molded object to be created, contraction rate data when sintering, and data in the movement direction of the recoater head. Therefore, it is possible to correct a displacement occurring in the molded object during molding.

However, compressive stress is generated in a part in which a metal material powder is thermally melted and re-solidified. In addition, while heat is applied to the solidified metal surface and rapid cooling is performed, tensile stress becomes the residual stress. Further, in the laminate molding described in said Japanese Translation No. H1-502890 of the PCT International Publication, several hundreds to several thousands of sintered layers are laminated to mold one molded object. Therefore, in the obtained molded object, in addition to the above stresses, residual stress is generated also in the lamination direction. Accordingly, the molded object obtained by sintering the metal material powder is displaced not only during molding but also after molding due to the above-described stresses.

Accordingly, as described in said Japanese Unexamined Patent Application Publication No. 2016-155257, in the molding program that performs correction assuming a displacement occurring during molding, size accuracy and shape accuracy of the obtained molded object are lowered.

SUMMARY

In view of the above circumstances, an aspect provided in an embodiment of the invention is to provide a laminate molding apparatus capable of performing a molding process with high accuracy in laminate molding by laser sintering.

A laminate molding apparatus according to a first embodiment of the invention includes a device which includes a laser emitting unit configured to emit a laser beam to an emission area of a powder layer made of a metal material powder and formed on a predetermined molding part and form a sintered layer based on a molding program corresponding to three-dimensional shape data of a molded object to be created and which molds an initial molded object formed by laminating the sintered layer; and a shape correction computation device configured to calculate three-dimensional finished shape data of the initial molded object after displacements occurred after molding of the initial molded object are completed, compare the three-dimensional finished shape data of the initial molded object with the three-dimensional shape data, calculate a displacement occurring in a direction orthogonal to the surface of the molded object, and calculate correction data in a direction opposite to the direction of the displacement and with the same magnitude of displacement, wherein, in the device, based on a corrected molding program corresponding to corrected three-dimensional shape data in which coordinates of the surface of the molded object to be created are corrected when the correction data is added to the three-dimensional shape data, under the same molding conditions as when the initial molded object is molded, the laser emitting unit emits a laser beam to a newly defined emission area of the powder layer, and a sintered layer is formed so that a corrected molded object formed by laminating the sintered layer is molded.

In an embodiment of the present invention, the initial molded object is molded using the molding program corresponding to the three-dimensional shape data of the molded object to be created, all displacements occurring in the initial molded object are completed, and three-dimensional finished shape data is then calculated. Then, the three-dimensional shape data of the molded object to be created is compared with the three-dimensional finished shape data of the initial molded object, correction data in a direction opposite to displacement occurring in a direction orthogonal to the surface of the initial molded object and with the same magnitude of displacement is added to the three-dimensional shape data of the molded object to be created, and corrected three-dimensional shape data in which coordinates of the surface of the molded object to be created are corrected is created. Then, a corrected molding program corresponding to the corrected three-dimensional shape data is generated, and a corrected molded object is molded under the same molding conditions as when the initial molded object is molded based on the molding program.

Here, when molding conditions such as the shape and size of the molded object to be created, a material of a powder material, an output of a laser beam to be emitted, a scanning speed, a scanning direction, a scanning order, and the like are the same, displacements occurring in the obtained molded object are substantially constant. Accordingly, when molding is performed based on the corrected molding program, it is possible to obtain a molded object in which all displacements occurring during molding and after molding are corrected. Thus, according to an embodiment of the present invention, it is possible to perform a molding process with high accuracy when a molded object with the same shape is created next.

In a laminate molding apparatus according to a second embodiment of the invention, in the first embodiment of the invention, the metal material powder is made of carbon steel, and a heat treatment is performed on the initial molded object to cause martensitic transformation after molding of the initial molded object and the three-dimensional finished shape data is then calculated.

In general, when the molded object molded by laser sintering is left, it takes a considerable time until displacements are completed. For example, in a molded object made of carbon steel, since displacement continues until martensitic transformation is completed, waiting for a considerable time from when the molded object is molded until the displacement is measured is needed.

According to an embodiment of the present invention, when a predetermined heat treatment is performed after the molding process is completed, it is possible to intentionally facilitate martensitic transformation. Thus, since it is possible to shorten a time until displacements conclude, compared to when the molded object is left and displacements are completed, it is possible to shorten a time until the displacements are measured. Accordingly, it is possible to improve working efficiency during molding.

A method of molding a laminate molded object according to a third embodiment of the invention includes a process of creating initial three-dimensional-shape data in which three-dimensional shape data of a molded object to be created is created; a process of generating initial molding program in which a molding program corresponding to the three-dimensional shape data is generated; a process of molding initial molded object in which a laser beam is emitted to an emission area of a powder layer made of a metal material powder and formed on a predetermined molding part, and a sintered layer is formed based on the molding program, and such that an initial molded object formed by laminating the sintered layer is molded; a process of completing displacements in which displacements occurred after molding of the initial molded object are completed; a process of calculating three-dimensional finished shape data in which three-dimensional finished shape data of the initial molded object is calculated; a process of calculating correction data in which the three-dimensional finished shape data is compared with the three-dimensional shape data, a displacement occurring in a direction orthogonal to the surface of the molded object is calculated, and correction data in a direction opposite to the direction of the displacement and with the same magnitude of displacement is calculated; a process of creating corrected three-dimensional shape data in which coordinates of the surface of the molded object to be created are corrected by adding the correction data to the three-dimensional shape data; a process of generating corrected molding program in which a corrected molding program corresponding to the corrected three-dimensional shape data is generated; and a process of molding corrected molded object in which the process of molding initial molded object is performed based on the corrected molding program, the laser emitting unit emits a laser beam to a newly defined emission area of the powder layer, a sintered layer is formed, and such that a corrected molded object formed by laminating the sintered layer is molded.

As described above, the displacements occurring in the molded object when the molding conditions are the same are substantially constant. Therefore, in the process of molding a corrected molded object, displacements substantially the same as the displacements occurring in the process of molding an initial molded object occur. Accordingly, when molding is performed based on the corrected molding program, it is possible to obtain a molded object in which all displacements occurring during molding and after molding are corrected. Thus, according to an embodiment of the present invention, it is possible to perform a molding process with high accuracy when a molded object with the same shape is created next.

In a method of molding a laminate molded object according to a fourth embodiment of the invention, in the third embodiment of the invention, the metal material powder is made of carbon steel, and, in the process of completing displacements, a heat treatment is performed on the initial molded object after molding of the initial molded object, and such that the initial molded object is martensitic-transformed.

According to an embodiment of the present invention, when a predetermined heat treatment is performed after the molding process is completed, it is possible to intentionally facilitate martensitic transformation. Thus, since it is possible to shorten a time until displacements conclude, compared to when the molded object is left and displacements are completed, it is possible to shorten a time until the displacements are measured. Accordingly, it is possible to improve working efficiency during molding.

According to an embodiment of the present invention, it is possible to perform a molding process with high accuracy in laminate molding by laser sintering.

DESCRIPTION OF THE EMBODIMENTS

Embodiments of the present invention are described below with reference to the drawings.

Figure 1:
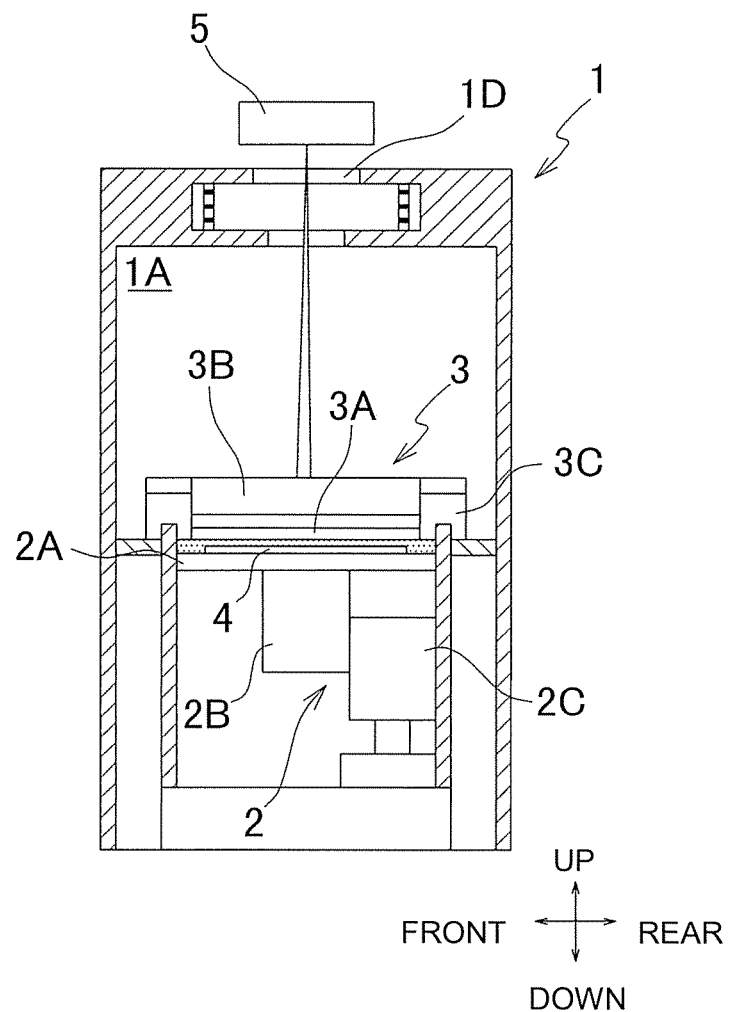
FIG. 1 is a side view of a laminate molding apparatus according to an embodiment.
Figure 2:
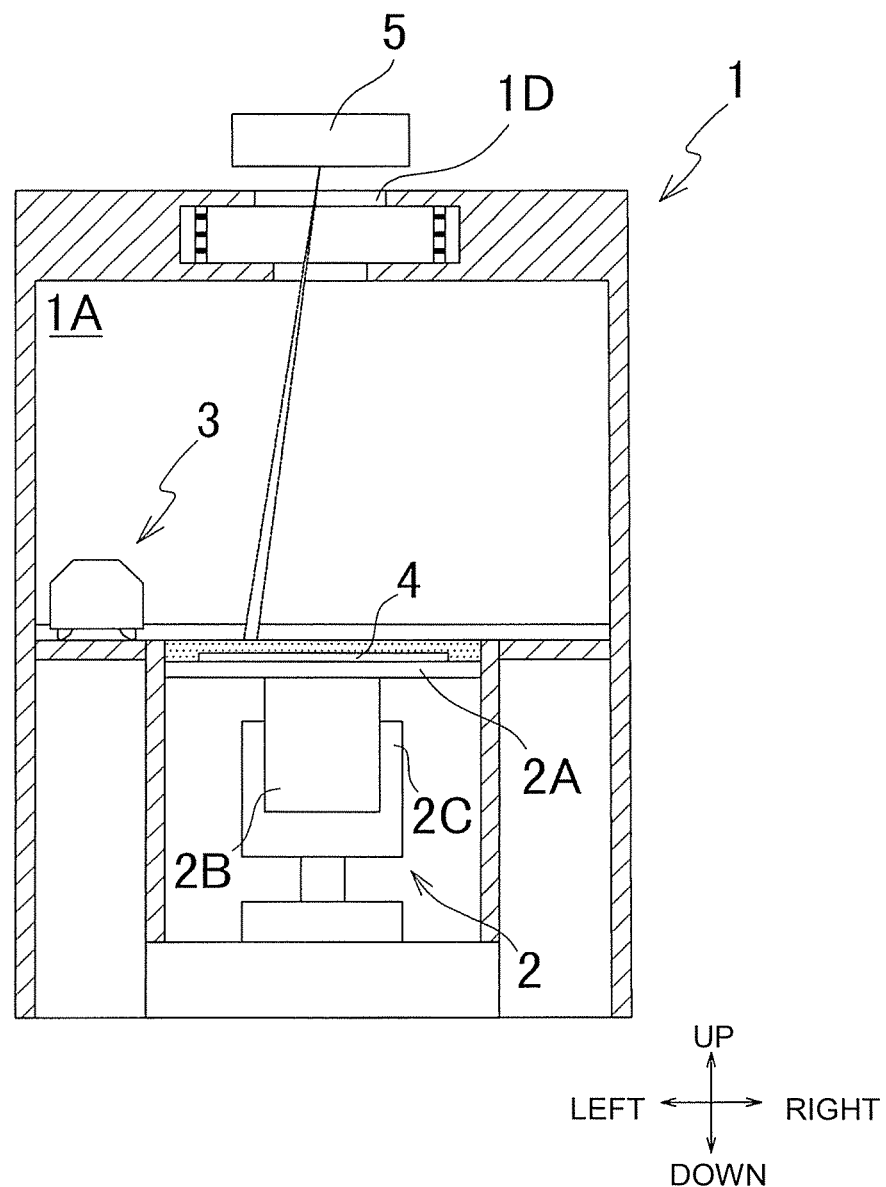
FIG. 2 is a front view of the laminate molding apparatus according to the embodiment.

A laminate molding apparatus 1 is a sintering type metal powder laminate molding apparatus. As shown in FIG. 1 and FIG. 2, the laminate molding apparatus 1 includes a molding chamber 1A provided in a molding tank. An inert gas is supplied into the molding chamber 1A from an inert gas supply device (not shown). Thus, an oxygen concentration is as low as possible in the molding chamber 1A. Note that, in the following, based on the drawing in FIG. 1, the left side is defined as "front," the right side is defined as "rear," the near side is defined as "right," the back side is defined as "left," the upper side is defined as "up," and the lower side is defined as "down," and direction terms "front," "rear," "right," "left," "up," and "down" are appropriately used for description.

A molding table 2A is accommodated in the molding chamber 1A. A molding space in which a metal material powder spreads is formed above the molding table 2A. A molding plate 4 on which a powder layer is formed is disposed on the molding table 2A.

As shown in FIG. 1 and FIG. 2, a powder layer forming apparatus 2 includes the molding table 2A, a support mechanism 2B configured to support and lift the molding table 2A, a transmission mechanism 2C configured to transmit an operation to the support mechanism 2B, a drive device including a motor configured to drive the support mechanism 2B, and the like. Whenever a powder layer is formed, the molding table 2A is lowered by a degree corresponding to the thickness of the powder layer to be formed next.

Figure 3:
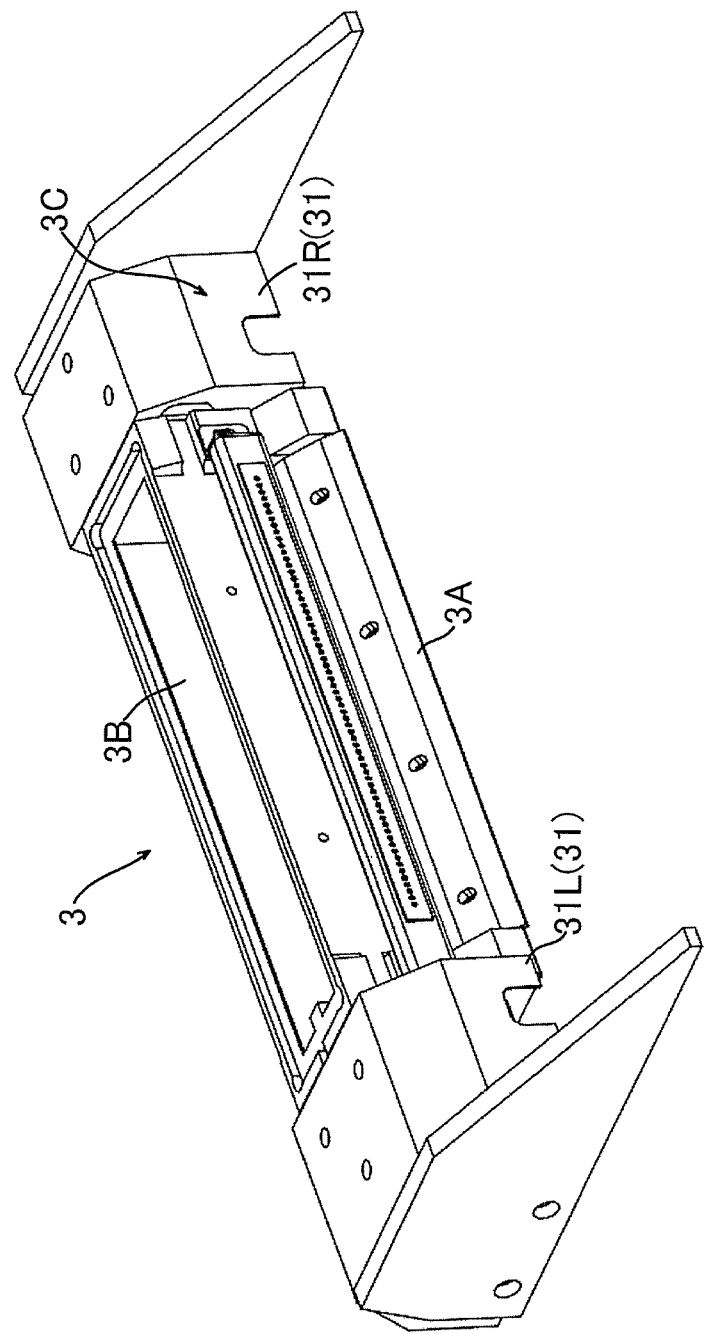
FIG. 3 is a perspective view showing a recoater head.
Figure 4:
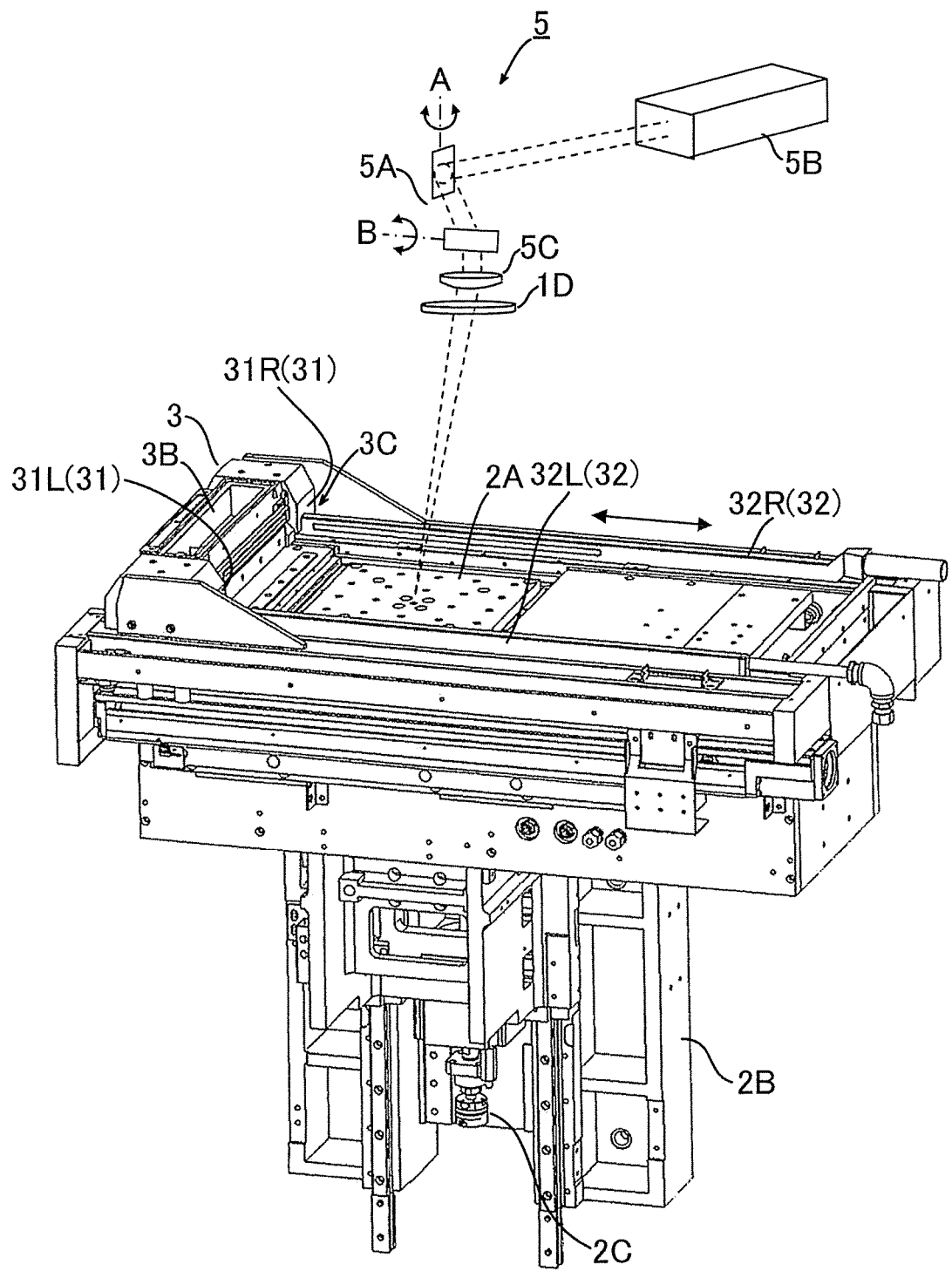
FIG. 4 is a perspective view of a powder layer forming apparatus and a laser emitting apparatus.

As shown in FIG. 3 and FIG. 4, a recoater head 3 includes a blade 3A, a material storage box 3B, and a guide mechanism 3C. The guide mechanism 3C includes a pair of bearings 31 and guide rails 32R and 32L which are a pair of shaft components 32 received by bearings 31R and 31L. The recoater head 3 moves on the molding table 2A in the left and right direction along the guide rails 32R and 32L of the guide mechanism 3C based on scan instructions from a blade servomotor control device 19 to be described below. Therefore, when a material powder is supplied from the material storage box 3B to the molding table 2A and is flattened by the blade 3A, a powder layer is formed on the molding plate 4.

A material supply device (not shown) configured to supply a material powder to the material storage box 3B is provided above a waiting position at which the recoater head 3 waits after the powder layer is formed. The material supply device appropriately supplies a powder material to the material storage box 3B so that there is not insufficient material powder in the material storage box 3B during molding of a laminate molded object.

When a laser emitting apparatus 5 emits a laser beam to a laser emission area set for each powder layer, a sintered layer is formed on a part or the entire area of the powder layer on the molding plate 4. The laser emitting apparatus 5 includes a laser scanning device 5A having two galvanometer mirrors, a laser oscillator 5B, a focal lens 5C, a laser control device 20 configured to control these components, and the like.

A laser beam having a predetermined energy output from the laser oscillator 5B passes through a laser transmission member and reaches the galvanometer mirrors of the laser scanning device 5A. A laser beam reflected at the pair of galvanometer mirrors is converged by the focal lens 5C and passes through a transmission lens 1D provided at a through-hole drilled at the top plate of the molding chamber 1A. A laser beam converged by the focal lens 5C is emitted with a predetermined spot diameter. In addition, the origin of a laser emission position is an emission position when a laser beam is emitted from the laser oscillator 5B in a vertical direction so that the laser beam is emitted orthogonal to the powder layer and is substantially the same as the center position of the molding plate 4 on which the powder layer is formed.

The laser scanning device 5A of the laser emitting apparatus 5 is installed on the top plate of the molding chamber 1A. The galvanometer mirrors of the laser scanning device 5A each include an electrical actuator (not shown) configured to rotate a galvanometer mirror. The electrical actuator is driven according to scan instructions from the laser control device 20. The laser scanning device 5A moves a laser spot at a predetermined movement speed along a predetermined scan path in order from one end side to the other end side of the emission areas by the laser control device 20.

A CAD device 12 creates solid data of a molded object molded by the laminate molding apparatus 1. The CAD device 12 includes a computation unit 13 configured to create solid data of a molded object, a storage unit 14 configured to store solid data created by the computation unit 13, and the like. Here, the solid data is three-dimensional data indicating the shape and size of a predetermined molded object.

A CAM device 15 generates a molding program from solid data created by the CAD device 12. The CAM device 15 includes a computation unit 16 configured to generate a molding program from solid data created by the CAD device 12, a storage unit 17 configured to store solid data created by the CAD device 12 and a molding program generated by the computation unit 16, and the like. Here, the molding program shows operation procedures of devices constituting the laminate molding apparatus when a predetermined molded object is molded. The molding program includes, for example, laser emission area data. The laser emission area data is used to define an emission area of a laser beam emitted from a laser emitting unit 5 to the powder layer for each powder layer.

Figure 6:
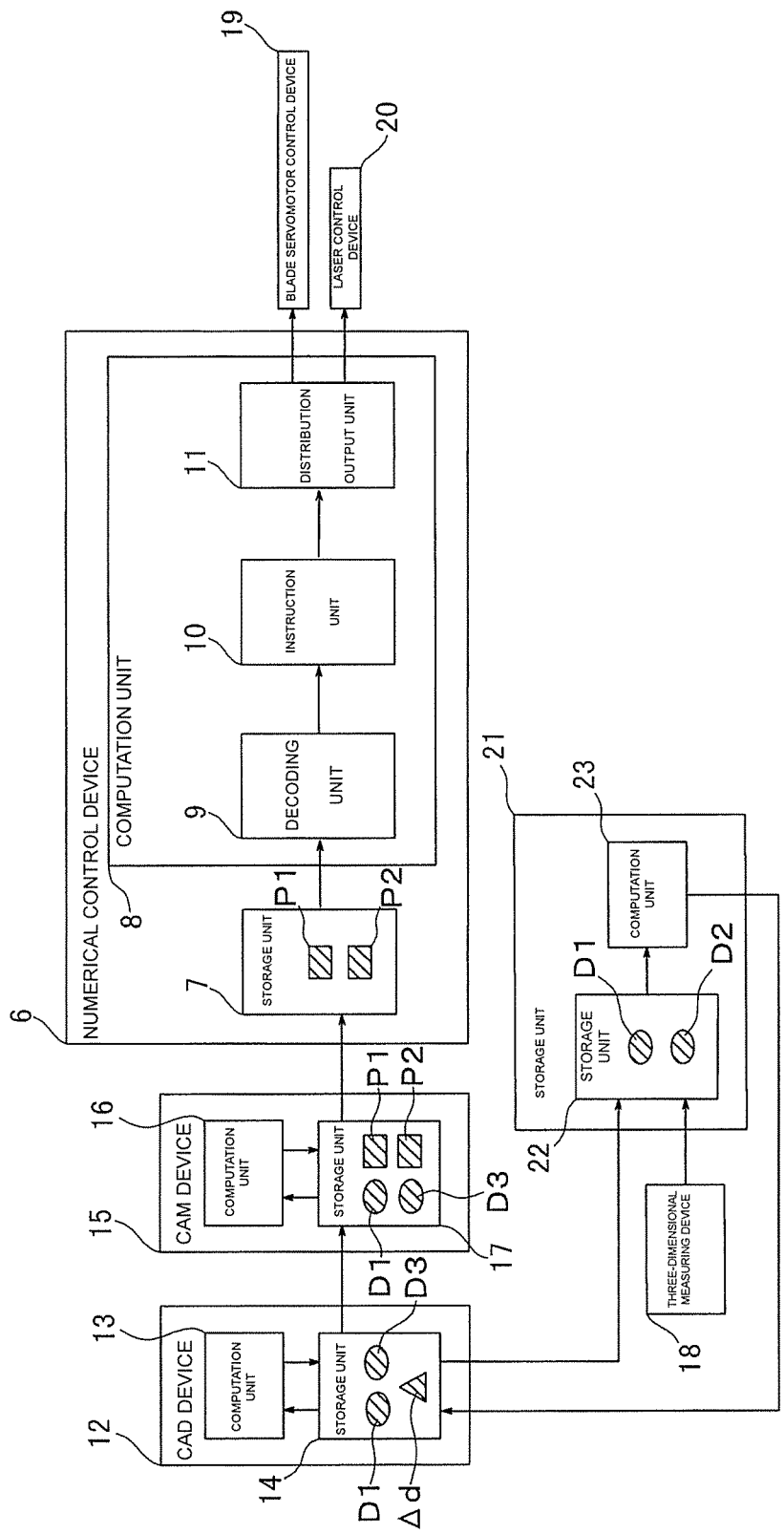
FIG. 6 is a block diagram showing control of devices constituting a laminate molding system.

As shown in FIG. 6, a numerical control device 6 includes a storage unit 7, a computation unit 8, and the like. The storage unit 7 is a hard disk in which a molding program of a laminate molded object generated by the CAM device 15 and the like are stored. The computation unit 8 includes a decoding unit 9 configured to decode the molding program and the like stored in the storage unit 7, an instruction unit 10 configured to output instructions based on the molding program decoded by the decoding unit 9, and a distribution output unit 11 configured to distribute and output the instructions from the instruction unit 10 to the above-described devices.

A blade servomotor reciprocates the blade 3A in the left and right direction based on instructions from the blade servomotor control device 19. A movement instruction from the instruction unit 10 of the computation unit 8 is input to the blade servomotor control device 19 as a signal or data.

The laser control device 20 includes an actuator control device, a drive current supply device, and the like, which are not shown. The laser control device 20 outputs scan instructions to the actuator control device as a signal or data based on the molding program. The electrical actuators of the laser emitting apparatus 5 receive a drive current according to scan instructions from the drive current supply device, and tilt the galvanometer mirror in a desired direction.

Incidentally, compressive stress is generated in a part in which a metal material powder is thermally melted and re-solidified. In addition, while heat is applied to the solidified metal surface and rapid cooling is performed, tensile stress becomes the residual stress. Furthermore, when laminate molding is performed, several hundreds to several thousands of the above-described sintered layers are laminated to obtain one molded object. Therefore, in addition to the above stress generated for each sintered layer, residual stress is generated also in the lamination direction. As described above, the actually obtained molded object may be greatly and complicatedly displaced from the molded object to be created.

Figure 5:
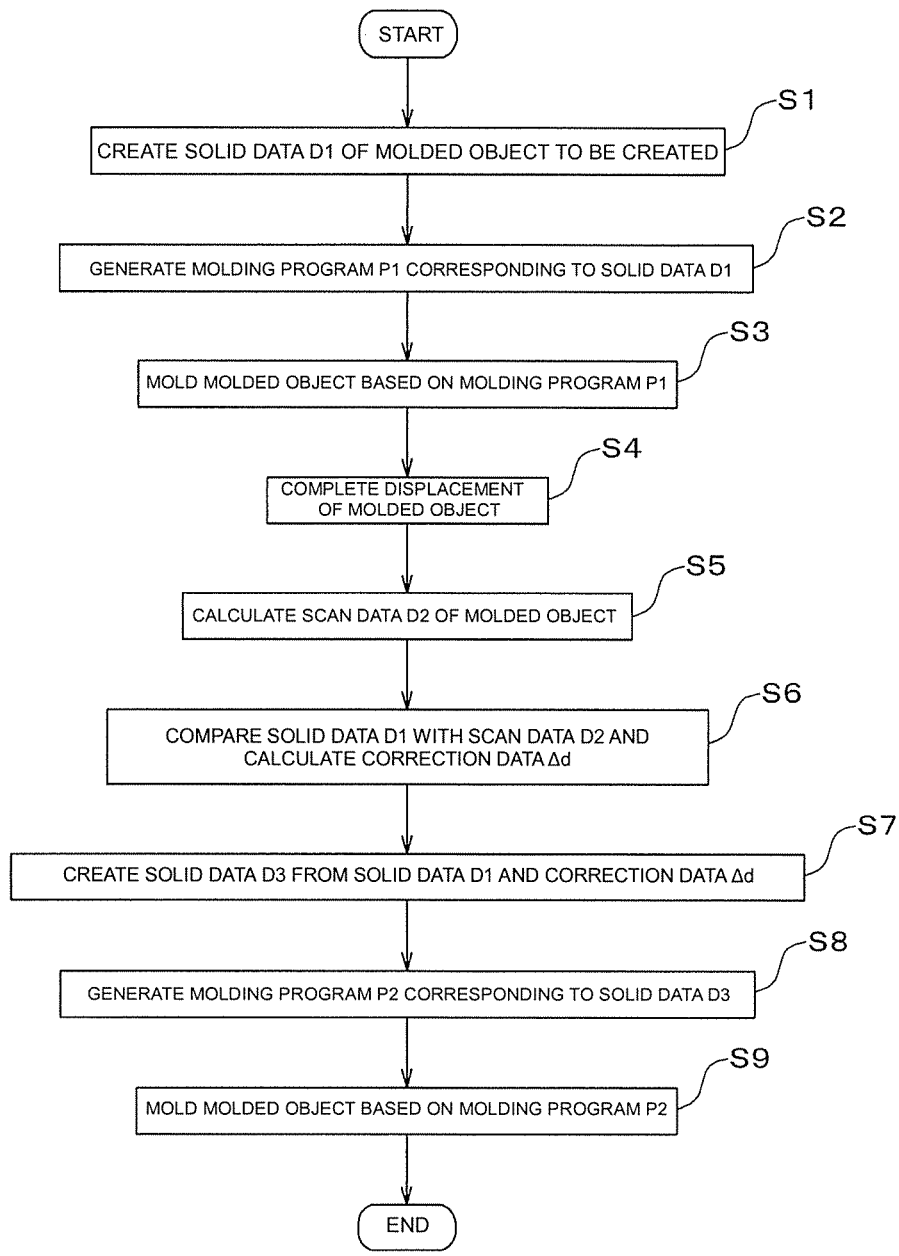
FIG. 5 is a flowchart showing a flow until a molded object to be created is obtained.

Here, in the present embodiment, a molded object is molded using a molding program P1 corresponding to solid data D1 of a molded object to be created, all displacements occurring in the actually obtained molded object are completed and scan data D2 thereof is then calculated. Then, the solid data D1 and the scan data D2 are compared to calculate a displacement, a new molding program P2 by which all displacements occurring during molding and after molding are corrected using the displacements, is generated, and the second and subsequent molded objects are molded based on the molding program P2. Controls and operations of the devices when the molding is performed are described below in detail with reference to a flowchart in FIG. 5 and FIG. 6.

First, in Step S1, solid data D1 of a molded object to be created is created. Further, in Step S2, a molding program P1 corresponding to the solid data D1 is generated. More specifically, the solid data D1 of the molded object to be created is created by the computation unit 13 of the CAD device 12 and stored in the storage unit 14. Then, the solid data D1 is loaded into the CAM device 15 and stored in the storage unit 17. The computation unit 16 of the CAM device 15 generates the molding program P1 corresponding to the solid data D1 stored in the storage unit 17 and stores it in the storage unit 17.

Next, in Step S3, the molded object is molded based on the molding program P1. More specifically, the molding program P1 generated by the CAM device 15 is loaded into the numerical control device 6 and stored in the storage unit 7. The decoding unit 9 of the computation unit 8 decodes the molding program P1 stored in the storage unit 7. The instruction unit 10 outputs instructions to the blade servomotor control device 19 and the laser control device 20 through the distribution output unit 11 in the order indicated by the molding program P1. The recoater head 3 moves a molding space in the molding tank in the left and right direction based on instructions from the blade servomotor control device 19, a material powder is supplied from the material storage box 3B and the material powder is flattened by the blade 3A so that a powder layer is formed on the molding plate 4. Then the laser emitting apparatus 5 emits a laser beam to an emission area set for each powder layer based on instructions from the laser control device 20 and a sintered layer is formed. After the sintered layer is formed, the molding table 2A is lowered by a degree corresponding to the thickness of the powder layer formed next. Then, as described above, a new powder layer is formed on the sintered layer, a laser beam is emitted to an emission area and a sintered layer is formed, and these processes are repeated to mold a molded object.

In Step S4, a displacement of the molded object is completed. When the molded object is made of carbon steel, if a heat treatment is performed to facilitate martensitic transformation, the displacement of the obtained molded object is completed in a short time. More specifically, a so-called sub-zero treatment of rapidly cooling to 0 degrees or less immediately after quenching is performed and then tempering is performed. The sub-zero treatment and tempering are performed a plurality of times.

Then, in Step S5, the scan data D2 of the molded object is calculated. More specifically, the molded object extracted from the molding chamber 1A is read by a three-dimensional measuring device 18, and the scan data D2 of the actually obtained molded object is calculated. The scan data D2 of the molded object is stored in a storage unit 22 of a shape correction computation device 21. Here, the scan data is three-dimensional data indicating the shape and size of a predetermined molded object like the solid data described above.

In Step S6, the solid data D1 and the scan data D2 are compared to calculate correction data Δd. More specifically, the solid data D1 stored in the storage unit 14 of the CAD device 12 is loaded into the shape correction computation device 21 and stored in the storage unit 22. A computation unit 23 of the shape correction computation device 21 superimposes coordinate axes of the scan data D2 and the solid data D1 on each other and then compares them and calculates a displacement occurring in the molded object during molding and after molding. Further, the computation unit 23 of the shape correction computation device 21 calculates the correction data Δd from the calculated displacement. The correction data Δd is loaded into the CAD device 12 and stored in the storage unit 14. Here, the displacement and the correction data Δd are described below in detail.

In Step S7, solid data D3 is created from the solid data D1 and the correction data Δd. More specifically, the computation unit 23 of the shape correction computation device 21 creates new solid data D3 from the solid data D1 of the molded object to be created and the correction data Δd and stores it in the storage unit 14. Then, the solid data D3 is loaded into the CAM device 15 and stored in the storage unit 17.

In Step S8, the molding program P2 corresponding to the solid data D3 is generated. More specifically, the computation unit 16 of the CAM device 15 generates a new molding program P2 corresponding to the solid data D3 and stores it in the storage unit 17. Here, the solid data D3 is described below in detail.

In Step S9, the molded object is molded based on the molding program P2. More specifically, the molding program P2 generated by the CAM device 15 is loaded into the numerical control device 6 and stored in the storage unit 7. The decoding unit 9 of the computation unit 8 decodes the molding program P2 stored in the storage unit 7. The instruction unit 10 outputs instructions to the blade servomotor control device 19 and the laser control device 20 through the distribution output unit 11 in the order indicated by the molding program P2. The recoater head 3 and the laser emitting apparatus 5 form a powder layer based on instructions from the blade servomotor control device 19 and the laser control device 20 and form a sintered layer by emitting a laser beam to an emission area newly set for each layer. Here, molding conditions when the second and subsequent molded objects are molded are the same as those when the first molded object is molded. The molding conditions include, for example, a material of a material powder, an intensity of a laser beam emitted from the laser emitting unit 5, a laser scanning speed, scanning direction, and scanning order, and the like.

Figure 8A:
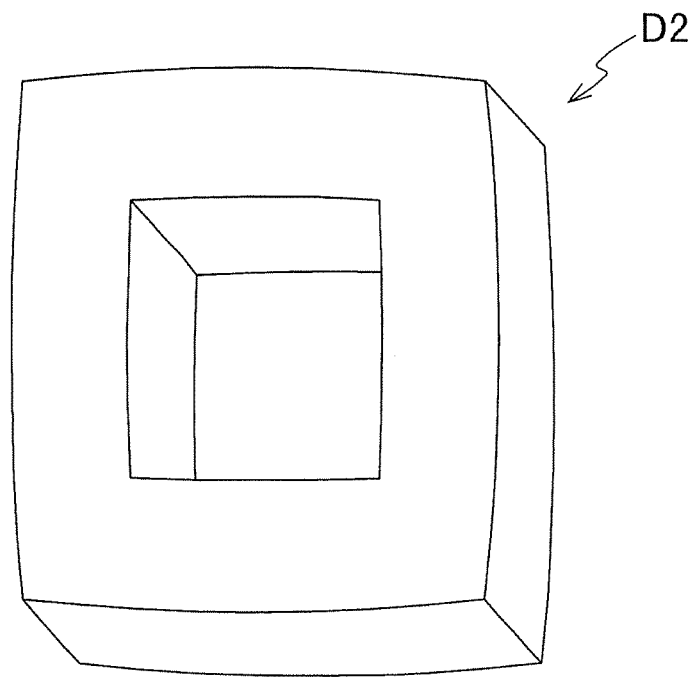
FIG. 8(a) is a perspective view of scan data of an actual molded object molded based on a molding program corresponding to solid data of a molded object to be created and FIG. 8(b) shows a sectional view of the scan data at a height Z1 and a sectional view of solid data of a molded object to be created in comparison.
Figure 8B:
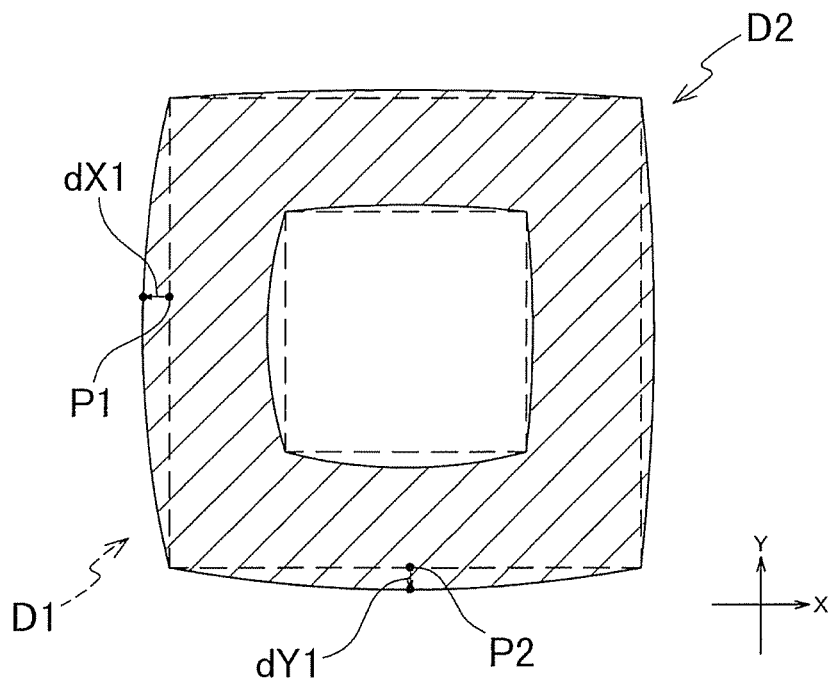
Figure 9A:
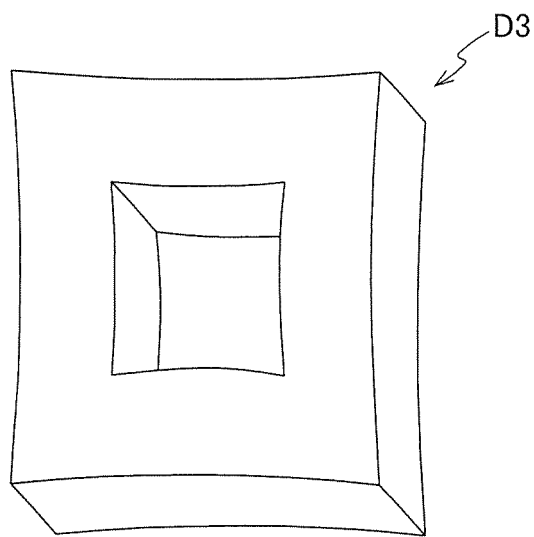
FIG. 9(a) is a perspective view of the corrected solid data.
Figure 9B:
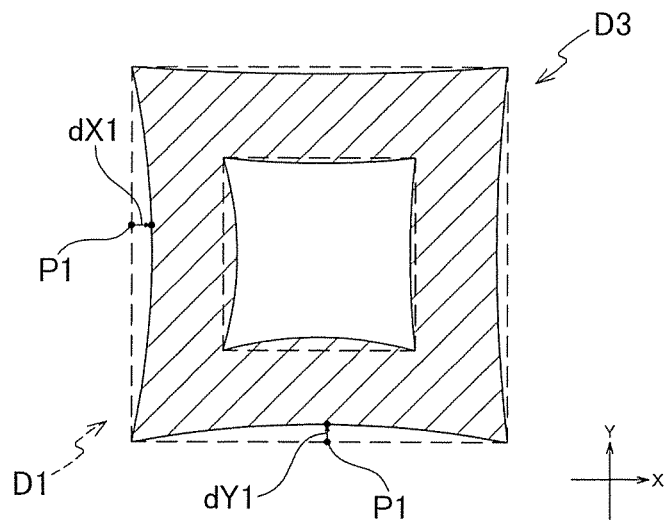
FIG. 9(b) shows a sectional view of the corrected solid data at a height Z1 and a sectional view of solid data of a molded object to be created in comparison.

Next, the displacement, correction data Δd, and solid data D3 described above are described in detail with reference to FIG. 7 to FIG. 9.

Figure 7A:
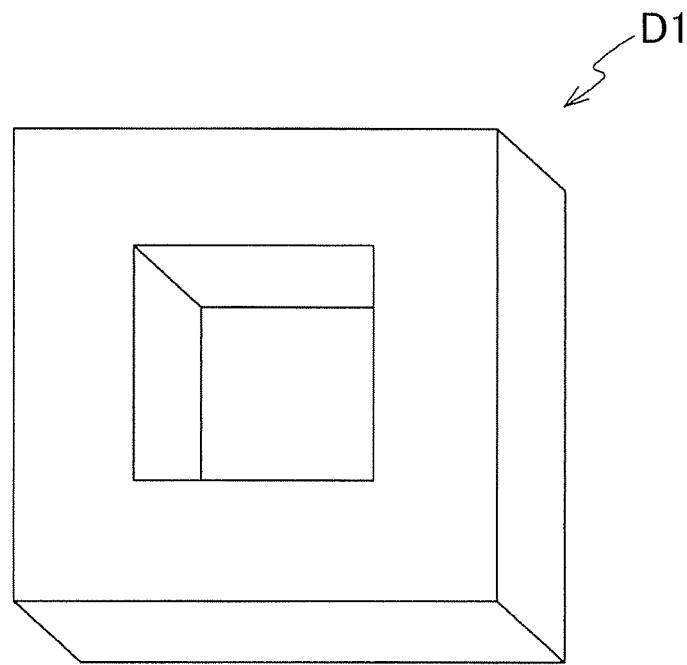
FIG. 7(a) is a perspective view of solid data of a molded object to be created and FIG. 7(b) is a sectional view of the solid data at a height Z1.
Figure 7B:
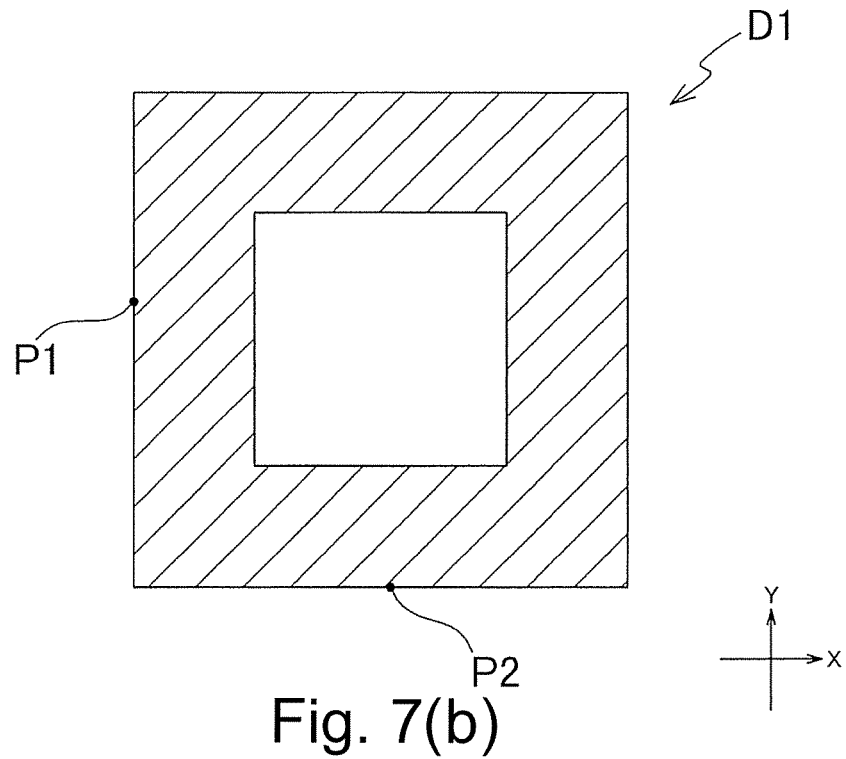

FIG. 7(*a*) is a perspective view of the solid data D1 of the molded object to be created and FIG. 7(*b*) is a sectional view of the solid data D1 at a height Z1. In addition, FIG. 8(*a*) is a perspective view of the scan data D2 of an actually molded object molded based on the molding program P1 corresponding to the solid data D1 of the molded object to be created, in which the center on the side surface is displaced to be convex to the outside. FIG. 8(*b*) shows a sectional view of the scan data D2 of the actually molded object at a height Z1 and a sectional view of the solid data D1 of the molded object to be created in comparison. Here, the scan data D2 of the actually molded object is indicated by a solid line, and the solid data D1 of the molded object to be created is indicated by a dashed line.

The computation unit 23 of the shape correction computation device 21 compares the scan data D2 of the actually molded object with the solid data D1 of the molded object to be created and calculates all displacements occurring in a direction orthogonal to the surface of the molded object for each point on the surface of the molded object. For example, as shown in FIG. 8(*b*), at a point P1 at a height Z1, the molded object is displaced −dX1 in the X direction orthogonal to the surface of the molded object. Accordingly, the displacement at the point P1 which is one point on the surface of the molded object is −dX1. In addition, at a point P2 at a height Z1, the molded object is displaced −dY1 in the Y direction orthogonal to the surface of the molded object. Accordingly, the displacement at the point P2 which is one point on the surface of the molded object is −dY1.

Further, the computation unit 23 of the shape correction computation device 21 calculates correction data in the direction opposite to the direction of displacement occurring in the direction orthogonal to the surface of the molded object and with the same magnitude of displacement as an inverse vector for each of the above displacements, that is, for each point on the surface of the molded object. For example, at the point P1 at which the displacement in the direction orthogonal to the surface of the molded object is −dX1, correction data is +dX1. In addition, at the point P2 at which the displacement in the direction orthogonal to the surface of the molded object is −dY1, correction data is +dY1. Data obtained when this calculation is performed on the entire surface of the actually molded object is set as the correction data Δd.

The computation unit 23 of the shape correction computation device 21 adds the correction data Δd to the solid data D1 of the molded object to be created, and creates new solid data D3 in which the solid data D1 of the molded object to be created is corrected on the entire surface of the molded object. More specifically, as shown in FIGS. 9(*a*) and 9(*b*), for example, at the point P1, there is correction of +dX1 in the X direction orthogonal to the surface of the molded object, and at the point P2, there is correction of +dY1 in the Y direction orthogonal to the surface of the molded object. The solid data D3 has a shape in which the center on the side surface is convex to the inside in the direction opposite to the direction of displacement occurring in the solid data D1. In the present embodiment, first, a first molded object is molded using the molding program P1 corresponding to the solid data D1 of the molded object to be created according to laminate molding using a laser beam. Then, all displacements occurring in the molded object are completed, and the displacement is then calculated, and the second and subsequent molded objects are molded based on a new molding program P2 that is generated based on the above-described correction method. Molding conditions at this time are the same as those when the first molded object is molded. As described above, when molding conditions such as the shape and size of the molded object to be created, a material of a powder material, an output of a laser beam to be emitted, a scanning speed, a scanning direction, a scanning order, and the like are the same, displacements occurring in the obtained molded object are substantially constant. Accordingly, when molding is performed based on the molding program P2, it is possible to obtain a molded object in which all displacements occurring during molding and after molding are corrected. As described above, according to the present embodiment, it is possible to obtain the second and subsequent molded objects to be created.

In addition, when the molded object is made of carbon steel, if the above-described heat treatment is performed, it is possible to intentionally facilitate martensitic transformation. Thus, since it is possible to shorten a time until displacements conclude, compared to when the molded object is left and displacements are completed, it is possible to shorten a time until the displacements are measured. Accordingly, it is possible to improve working efficiency during molding.

While exemplary embodiments of the present invention have been described above, the present invention is not limited to the above embodiments and examples, and various design modifications can be made within the scope of the appended claims.

A case in which the solid data D3 is created by the shape correction computation device 21 and the solid data D3 is then loaded into the CAM device 15 has been described in the present embodiment. However, for example, a case in which, after the solid data D3 is created by the shape correction computation device 21, the shape of the solid data D3 is confirmed by the CAD device 12, an operator manually corrects the solid data D3, and the solid data D3 of which the shape is confirmed and which is manually corrected is loaded into the CAM device 15 is possible.

In addition, a case in which, when the molded object is made of carbon steel, the above-described heat treatment is performed, and the molded object is martensitic-transformed has been described in the present embodiment. However, waiting until displacements are completed while leaving without performing a heat treatment is possible. In addition, when the molded object is made of a material other than carbon steel, for example, the waiting time may be set to a time shorter than a time until displacements are completed, and the same correction may be performed a plurality of times. Therefore, it is possible to shorten the time and ensure size accuracy and shape accuracy of the obtained molded object.

In addition, a case in which the solid data D3 is created from the solid data D1 and the correction data Δd, and the molding program P2 corresponding to the solid data D3 is then generated has been described in the present embodiment. However, for example, the molding program P2 may be generated by correcting the molding program P1 corresponding to the target solid data D1 using the correction data Δd. This means rewriting a sintered area for each layer of the molded object to be created defined in the molding program P1.

In addition, a case in which displacements occurring in the entire surface of the molded object are calculated has been described in the present embodiment. However, for example, displacements occurring in a part of the surface of the molded object may be calculated. In this case, for example, correction data is calculated by roughly estimating displacements occurring in the entire surface of the molded object from displacements occurring in a part of the surface of the molded object as a function, and the solid data D1 is corrected based on the calculated data, and such that the solid data D3 is created.

In addition, a case in which the scan data D2 of the molded object is calculated by the three-dimensional measuring device 18 that is provided separately from the laminate molding apparatus 1 has been described in the present embodiment. However, for example, a three-dimensional measuring device may be provided in the molding chamber 1A of the laminate molding apparatus 1, a three-dimensional measuring device may be controlled by the numerical control device 6, and such that the scan data D2 of the molded object may be calculated. That is, as in the present embodiment, the molded object may be molded and corrected using a laminate molding system in which the three-dimensional measuring device 18 is provided separately from the laminate molding apparatus 1, and the molded object may be molded and corrected by the laminate molding apparatus 1 into which a three-dimensional measuring device is built without separately providing the three-dimensional measuring device 18.

In addition, a case in which displacements and the correction data Δd are calculated by the shape connection computation device 21 separately provided in addition to the CAD device 12, the CAM device 15, and the numerical control device 6 has been described in the present embodiment. However, for example, the shape correction computation device 21 may be mounted in the numerical control device 6, the CAD device 12, or the CAM device 15, and displacements and the correction data Δd may be calculated. In this case, there is no need to separately provide the shape correction computation device 21 as in the present embodiment.

In addition, while the solid data D3 that is created by the shape correction computation device 21 has been described in the present embodiment, for example, as described above, the shape correction computation device 21 may be mounted in the CAD device 12 and the solid data D3 may be created.

In addition, while the molding program that is generated based on the solid data has been described in the present embodiment, for example, surface data may be created by the CAD device 12 and a molding program may be generated based on the surface data.

What is claimed is:

1. A laminate molding apparatus, comprising:
    a device which comprises a laser emitting unit configured to emit a laser beam to an emission area of a powder layer made of a material powder made of carbon steel and formed on a predetermined molding part and to form a sintered layer based on a molding program corresponding to three-dimensional shape data of a molded object to be created, and which molds an initial molded object formed by laminating the sintered layer; and a shape correction computation device configured to calculate three-dimensional finished shape data of the initial molded object after displacements occurred when a heat treatment is performed on the initial molded object to cause a martensitic transformation after molding of the initial molded object are completed, wherein the displacements are occurred in which a corresponding surface of surfaces that constitute surfaces of the initial molded object which corresponds to a surface formed as a flat surface in the three-dimensional shape data of the molded object to be created is convex toward outside or convex toward inside, to compare the three-dimensional finished shape data of the initial molded object with the three-dimensional shape data to calculate a displacement occurring in a direction orthogonal to the corresponding surface, and to calculate correction data in a direction opposite to the direction of the displacement and with the same magnitude of displacement, wherein, in the device, based on a corrected molding program corresponding to corrected three-dimensional shape data in which coordinates of the surface of the molded object to be created are corrected when the correction data is added to the three-dimensional shape data, under the same molding conditions as when the initial molded object is molded, the laser emitting unit emits a laser beam to a newly defined emission area of the powder layer, and a sintered layer is formed so that a corrected molded object formed by laminating the sintered layer is molded.

2. A method of molding a laminate molded object, comprising:
    a process of creating initial three-dimensional-shape data in which three-dimensional shape data of a molded object to be created is created;
    a process of generating initial molding program in which a molding program corresponding to the three-dimensional shape data is generated;
    a process of molding initial molded object in which a laser beam is emitted to an emission area of a powder layer made of a material powder made of carbon steel and formed on a predetermined molding part and a sintered layer is formed based on the molding program, such that an initial molded object formed by laminating the sintered layer is molded;
    a process of completing displacements in which displacements occurring when a heat treatment is performed on the initial molded object to cause a martensitic transformation after molding of the initial molded object are completed, wherein the displacements are occurred in which a corresponding surface of surfaces that constitute surfaces of the initial molded object which corresponds to a surface formed as a flat surface in the three-dimensional shape data of the molded object to be created is convex toward outside or convex toward inside;
    a process of calculating three-dimensional finished shape data in which three-dimensional finished shape data of the initial molded object is calculated;
    a process of calculating correction data in which the three-dimensional finished shape data is compared with the three-dimensional shape data, a displacement occurring in a direction orthogonal to the corresponding surface is calculated, and correction data in a direction opposite to the direction of the displacement and with the same magnitude of displacement is calculated;

a process of creating corrected three-dimensional shape data in which coordinates of the surface of the molded object to be created are corrected by adding the correction data to the three-dimensional shape data;

a process of generating corrected molding program in which a corrected molding program corresponding to the corrected three-dimensional shape data is generated; and a process of molding corrected molded object in which the process of molding initial molded object is performed based on the corrected molding program, the laser emitting unit emits a laser beam to a newly defined emission area of the powder layer, a sintered layer is formed, and such that a corrected molded object formed by laminating the sintered layer is molded.

* * * * *